United States Patent
Lin et al.

(10) Patent No.: US 10,199,075 B2
(45) Date of Patent: Feb. 5, 2019

(54) METHOD AND PLAYBACK DEVICE FOR CONTROLLING WORKING STATE OF MOBILE TERMINAL, AND STORAGE MEDIUM

(71) Applicant: Beijing Xiaomi Mobile Software Co., Ltd., Haidian District, Beijing (CN)

(72) Inventors: Xingsheng Lin, Beijing (CN); Zhiyong Feng, Beijing (CN); Xuanran Wang, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/620,826

(22) Filed: Jun. 13, 2017

(65) Prior Publication Data
US 2017/0358325 A1    Dec. 14, 2017

(30) Foreign Application Priority Data
Jun. 13, 2016 (CN) .......................... 2016 1 0422943

(51) Int. Cl.
*H04N 9/80* (2006.01)
*H04N 5/775* (2006.01)
(Continued)

(52) U.S. Cl.
CPC ............ *G11B 27/36* (2013.01); *G06F 1/3206* (2013.01); *G06F 1/3209* (2013.01);
(Continued)

(58) Field of Classification Search
CPC .................................. G09G 5/12; G11B 27/36
(Continued)

(56) References Cited

U.S. PATENT DOCUMENTS 6,970,080 B1    11/2005 Crouch et al.
2010/0085724 A1*  4/2010 Park .................. H04M 1/23
                                                       361/810
(Continued)

FOREIGN PATENT DOCUMENTS

AU    2014213221 A1    7/2015
CN    102306047 A      1/2012
(Continued)

OTHER PUBLICATIONS

Extended European Search Report for European application No. 17175511.9, dated Nov. 16, 2017.
(Continued)

*Primary Examiner* — Robert Chevalier
(74) *Attorney, Agent, or Firm* — Jun He Law Offices P.C.; James J. Zhu (57) ABSTRACT

A method and playback device for controlling a working state of a mobile terminal, and a storage medium are provided. The mobile terminal is communicated with a playback device, and the playback device includes a sensor, a detector and a transmitter. The method includes: determining, by the sensor, that a current state of the playback device is in an inactive state; detecting, by the detector, whether the mobile terminal is in a working state; and sending, by the transmitter, to the mobile terminal an instruction for instructing the mobile terminal to shift into a standby state when the mobile terminal is in the working state.

12 Claims, 4 Drawing Sheets

(51) Int. Cl.
*G11B 27/36* (2006.01)
*G09G 5/12* (2006.01)
*H04W 52/02* (2009.01)

(52) U.S. Cl.
CPC ............ *G06F 1/3231* (2013.01); *G09G 5/12* (2013.01); *H04W 52/0245* (2013.01); *Y02D 10/173* (2018.01); *Y02D 70/00* (2018.01); *Y02D 70/142* (2018.01); *Y02D 70/144* (2018.01); *Y02D 70/166* (2018.01); *Y02D 70/26* (2018.01)

(58) Field of Classification Search
USPC .................................. 386/230, 248, 314, 353
See application file for complete search history.

(56) References Cited

U.S. PATENT DOCUMENTS

| | | |
|---|---|---|
| 2015/0033053 A1 | 1/2015 | Kim et al. |
| 2015/0282069 A1 | 10/2015 | Hobbs et al. |

FOREIGN PATENT DOCUMENTS

| | | | |
|---|---|---|---|
| CN | 103516901 | A | 1/2014 |
| CN | 104598130 | A | 5/2015 |
| CN | 105302284 | A | 2/2016 |
| CN | 105357402 | A | 2/2016 |
| CN | 105373208 | A | 3/2016 |
| CN | 106125881 | A | 11/2016 |
| EP | 3023859 | A1 | 5/2016 |
| JP | H11-64780 | A | 3/1999 |
| JP | H11-64870 | A | 3/1999 |
| JP | 2000352519 | A | 12/2000 |
| JP | 2001092562 | A | 4/2001 |
| JP | 2001-189900 | A | 7/2001 |
| JP | 2011101107 | A | 5/2011 |
| JP | 2015179340 | A | 10/2015 |
| KR | 2009000127 | * | 1/2009 |
| RU | 2504821 | C2 | 1/2014 |
| WO | 2012077834 | A1 | 6/2012 |
| WO | 2014/155497 | A1 | 10/2014 |
| WO | 2015037056 | A1 | 3/2015 |
| WO | 2015126177 | A1 | 8/2015 |

OTHER PUBLICATIONS

International Search Report for International application No. PCT/CN2016/107687, dated Mar. 2, 2017.

Non-final Office Action in Japanese patent application No. 2017-505239, dated Nov. 13, 2018.

* cited by examiner

METHOD AND PLAYBACK DEVICE FOR CONTROLLING WORKING STATE OF MOBILE TERMINAL, AND STORAGE MEDIUM

CROSS-REFERENCE TO RELATED APPLICATIONS

The present disclosure is based upon and claims priority to Chinese Patent Application No. 201610422943.2, filed on Jun. 13, 2016, the entire contents of which are incorporated herein by reference.

TECHNICAL FIELD

The present disclosure generally relates to a field of internet technologies, and more particularly, to a method and playback device for controlling a working state of a mobile terminal, and a storage medium.

BACKGROUND

VR (Virtual Reality) technology, which comprehensively utilizes computer graphics systems and various interface devices such as realistic interface, controlling interface and the like, provides an immersive feel in a computer-generated, interactive and three-dimensional environment. VR technology is broadly used in urban planning, interior design, industrial simulation, relics restoration, bridge/road designing, real estate sales, tourism teaching, water conservancy and power generation, geologic hazard, education and training and the like, to provide feasible solutions thereof.

SUMMARY

Embodiments of the present disclosure provide a method and playback device for controlling a working state of a mobile terminal, and a storage medium.

According to a first aspect of embodiments of the present disclosure, there is provided a method for controlling a working state of a mobile terminal, and the mobile terminal is communicated with a playback device comprising a sensor, a detector and a transmitter. The method includes: determining, by the sensor, that a current state of the playback device is in an inactive state; detecting, by the detector, whether the mobile terminal is in a working state; and sending, by the transmitter, to the mobile terminal an instruction for instructing the mobile terminal to shift into a standby state when the mobile terminal is in the working state.

According to a second aspect of embodiments of the present disclosure, there is provided a playback device for controlling a working state of a mobile terminal, and the mobile terminal is communicated with the playback device. The playback device includes a sensor, a detector, a transmitter, a processor, and a memory configured to store instructions executable by the processor. The processor is configured to: determine, by the sensor, that a current state of the playback device is in an inactive state; detect, by the detector, whether the mobile terminal is in a working state; and send, by the transmitter, to the mobile terminal an instruction for instructing the mobile terminal to shift into a standby state when the mobile terminal is in the working state.

According to a third aspect of the present disclosure, there is provided a non-transitory computer-readable storage medium having stored therein instructions that, when executed by a processor of a playback device, causes the playback device to perform a method for controlling a working state of a mobile terminal, and the mobile terminal is communicated with the playback device comprising a sensor, a detector and a transmitter. The method includes: determining, by the sensor, that a current state of the playback device is in an inactive state; detecting, by the detector, whether the mobile terminal is in a working state; and sending, by the transmitter, to the mobile terminal an instruction for instructing the mobile terminal to shift into a standby state when the mobile terminal is in the working state.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments and, together with the description, serve to explain the principles of the present disclosure.

Exemplary embodiments of the present disclosure are shown in the above drawings, and further detailed description will be provided hereinafter. These drawings and written descriptions are not intended to limit the scope of the present disclosure in any way, but to convey the concept of the present disclosure to one of ordinary skill in this art by referring to particular exemplary embodiments.

DETAILED DESCRIPTION

Reference will now be made in detail to exemplary embodiments, examples of which are illustrated in the accompanying drawings. The following description refers to the accompanying drawings in which the same numbers in different drawings recurrent the same or similar elements unless otherwise represented. The implementations set forth in the following description of exemplary embodiments do not recurrent all implementations consistent with the present disclosure. Instead, they are merely examples of apparatuses and methods consistent with aspects related to the present disclosure as recited in the appended claims.

Figure 1:
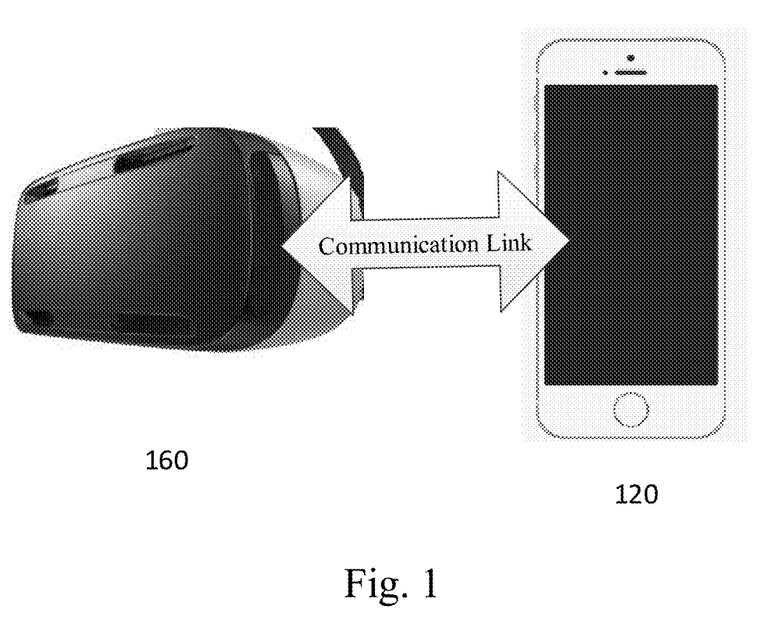
FIG. 1 is a schematic diagram showing an implementation environment involved in various embodiments of the present disclosure.

FIG. 1 is a schematic diagram showing an implementation environment involved in various embodiments of the present disclosure, the implementation environment includes: a mobile terminal 120 (take a mobile phone as an example) and a playback device 160 (take a VR playback device as an example).

The mobile terminal 120 refers to a device providing multimedia information or a device having a capacity of interacting with the playback device 160, which may have independent processing capacity and power source. The mobile terminal 120, for example, may be a mobile terminal such as a mobile phone, a tablet, an e-book reader, a personal digital assistant and the like, or may be a smart household appliance such as a Smart IP Camera, a Smart Television and the like, or may be a wearable apparatus such as a smart band, smart watch, smart helmet and the like, or the like. In the embodiments of the present disclosure, for example, a mobile phone is taken as the mobile terminal 120 to explain the embodiments.

The playback device 160 refers to a device which has established a communication link with the mobile terminal 120, receives and plays multimedia information provided by the mobile terminal 120, and a device which may interact with the mobile terminal 120. The playback device 160 may be a VR player, smart glasses, a smart helmet and the like. The manner of communication link between the mobile terminal 120 and the playback device 160 may be a wired communication link, a wireless communication link and the like. When the manner is the wired communication link, external interfaces of the mobile terminal 120 and the playback device 160, such as the USB interfaces, may be connected via a data line. When the manner is the wireless communication link, the mobile terminal 120 and the playback device 160 may be connected via Wi-Fi (Wireless Fidelity) connection, Bluetooth connection and the like.

In the above playback device 160 and the mobile terminal 120, applications are run to perform information interaction, and operating instructions may be triggered by a physical button, a touch key, a virtual button and the like.

Figure 2:
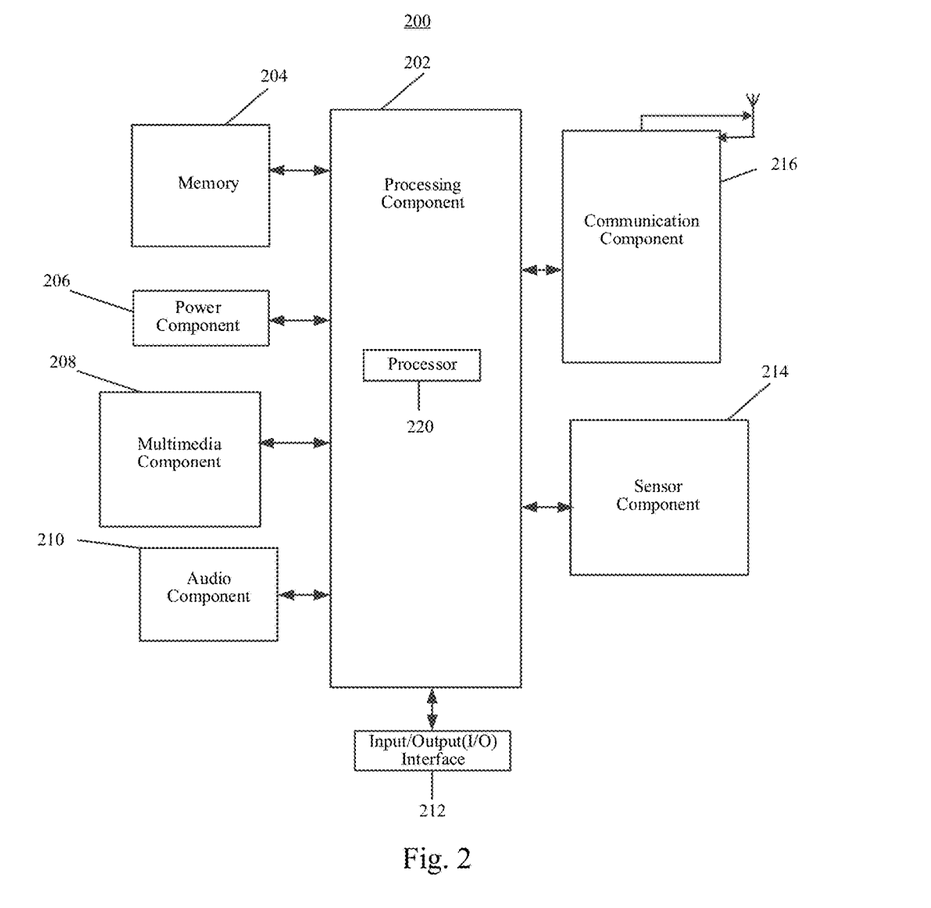
FIG. 2 is a block diagram illustrating an apparatus according to an exemplary embodiment.

FIG. 2 is a block diagram illustrating an apparatus 200 for controlling a working state according to an exemplary embodiment. The apparatus 200 may be applicable in a mobile terminal 120 or a playback device 160. For example, the apparatus 200 may be a mobile phone, a computer, a digital broadcast terminal, a messaging apparatus, a gaming console, a tablet, a medical apparatus, exercise equipment, a personal digital assistant, a smart household appliance, a wearable apparatus and the like.

Referring to FIG. 2, the apparatus 200 may include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200, such as the operations associated with display, telephone calls, data communications, camera operations, and recording operations. The processing component 202 may include one or more processors 220 to execute instructions to perform all or a part of the steps in the above-described methods. In addition, the processing component 202 may include one or more modules which facilitate the interaction between the processing component 202 and other components. For example, the processing component 202 may include a multimedia module to facilitate the interaction between the multimedia component 208 and the processing component 202.

The memory 204 is configured to store various types of data to support the operations of the apparatus 200. Examples of such data include instructions for any application or method operated on the apparatus 200, contact data, phonebook data, messages, pictures, videos, and the like. The memory 204 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200. The power component 206 may include a power management system, one or more power supplies, and other components associated with the generation, management, and distribution of power in the apparatus 200.

The multimedia component 208 includes a screen providing an output interface between the apparatus 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front camera and/or a rear camera. The front camera and/or the rear camera may receive external multimedia data while the apparatus 200 is in an operation mode, such as a photographing mode or a video mode. Each of the front camera and the rear camera may be a fixed optical lens system or have focus and optical zoom capability.

The audio component 210 is configured to output and/or input audio signals. For example, the audio component 210 includes a microphone (MIC) configured to receive an external audio signal when the apparatus 200 is in an operation mode, such as a call mode, a recording mode, or a voice recognition mode. The received audio signal may be further stored in the memory 204 or transmitted via the communication component 216. In some embodiments, the audio component 210 further includes a speaker to output audio signals.

The I/O interface 212 provides an interface between the processing component 202 and a peripheral interface module, such as a keyboard, a click wheel, a button, or the like. The buttons may include, but are not limited to, a home button, a volume button, a starting button, and a locking button.

The sensor component 214 includes one or more sensors to provide status assessments of various aspects of the apparatus 200. For example, the sensor component 214 may detect an open/closed status of the apparatus 200, relative positioning of components, e.g., the display and the keypad, of the apparatus 200, a change in position of the apparatus 200 or a component of the apparatus 200, a presence or absence of user contact with the apparatus 200, an orientation or an acceleration/deceleration of the apparatus 200, and a change in temperature of the apparatus 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communications, wired or wirelessly, between the apparatus 200 and other apparatuses. The apparatus 200 may access a wireless network based on a communication standard, such as WiFi, 2G or 3G or a combination thereof. In one exemplary embodiment, the communication component 216 receives a broadcast signal or broadcast associated notification information from an external broadcast management system via a broadcast channel. In one exemplary embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 200 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 204, executable by the processor 220 in the apparatus 200, for performing the above-described methods. For example, the non-transitory computer-readable storage medium may be a ROM, a random access memory (RAM), a compact disc read-only memory (CD-ROM), a magnetic tape, a floppy disc, an optical data storage apparatus, or the like.

A non-transitory computer-readable storage medium, when the instructions of the storage medium is executed by the processor of the apparatus 200 and the apparatus 200 is applied to the mobile terminal 120 or the playback device 160, the apparatus 200 can execute the methods in the following embodiments.

Figure 3:
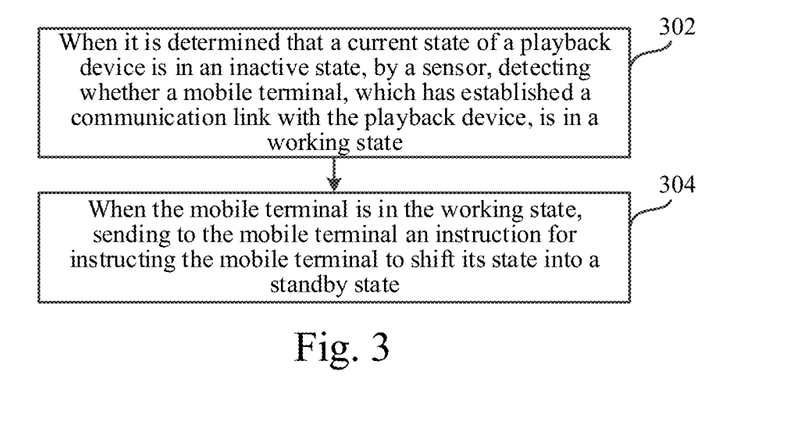
FIG. 3 is a flow chart of a method for controlling a working state according to an exemplary embodiment.

FIG. 3 is a flow chart of a method for controlling a working state according to an exemplary embodiment. In the present embodiment, for example, the method for controlling a working state is applicable in the playback device 160 in the implementation environment shown in FIG. 1. The method may include the following steps.

In step 302, when it is determined that a current state is in an inactive state, by a sensor, it may be detected whether a mobile terminal, which has established a communication link, is in a working state. The "inactive state" may refer to a state in which the device is not actively performing its functions, and in other words, it is possible that the device is idle while it is not under use. Further, the "working state" may refer to a state in which the device is actively performing its functions, and in other words, it is possible that the device is busy while it is currently operating.

In some embodiments, when the sensor is a pressure sensor which generates a pressure signal in the case of an active state, it is determined that the current state is in the inactive state, according to that the pressure signal, detected by the pressure sensor, is less than a pressure threshold value. It may be determined that the current state is in the inactive state once the pressure signal is less than the pressure threshold value, or it may be determined that the current state is in the inactive state after the pressure signal is less than the pressure threshold value for a period of time, which is greater than a predetermined time threshold value such as 10 seconds, 30 seconds and the like. In the present embodiment, the "active state" may refer to a state in which the sensor is activated, for example, with respect to the pressure sensor, it may switch into an active sate when a pressure higher than its threshold is sensed.

Alternatively, when the sensor is an optical sensor which generates light signal intensity in the case of an active state, it is determined that the current state is in the inactive state, according to that the light signal intensity, detected by the optical sensor, is less than a light signal threshold value. It may be determined that the current state is in the inactive state once the light signal intensity is less than the light signal threshold value, or it may be determined that the current state is in the inactive state after the light signal intensity is less than the light signal threshold value for a period of time, which is greater than a predetermined time threshold value such as 5 seconds, 10 seconds, 12 seconds and the like.

Alternatively, when the sensor is a position sensor, it is determined that the current state is in the inactive state, according to that a position move value, detected by the position sensor, is less than a move threshold value. It may be determined that the current state is in the inactive state once the position move value is less than the move threshold value, or it may be determined that the current state is in the inactive state after the position move value is less than the move threshold value for a period of time, which is greater than a predetermined time threshold value such as 30 seconds, 1 minutes, 5 minutes and the like.

The above sensor may include one of a pressure sensor, an optical sensor and a position sensor or various combinations thereof. Further, the sensor may be other sensors which are capable of obtain the detecting results, such as an infrared sensor, a temperature sensor and the like.

In some embodiments, the detecting whether a mobile terminal, which has established a communication link, is in a working state, includes: detecting whether multimedia information or mutual information sent from the mobile terminal is received. Multimedia information or mutual information is sent by a communication link between the mobile terminal 120 and playback device 160. For example, in the case that the playback device 160 plays a multimedia file, the selected multimedia file is invoked and played by opening an application in the mobile terminal 120 or the playback device 160. Audio and Video are sent from the mobile terminal 120 via a communication link to the playback device 160 to be played. For example, in the case of controlling the mobile terminal 120, the playback device 160 sends, via a communication link, a controlling instruction to the mobile terminal 120. The mobile terminal 120 subsequently feed the response result back to the playback device 160 via the communication link to complete the interaction. The mutual information refers to operating information between the playback device 160 and the mobile terminal 120, for example, controlling instructions, opening instructions, closing instructions and the like, and various response information. Accordingly, by detecting whether multimedia information or mutual information sent by the mobile terminal 120 is received, it may be determined whether the mobile terminal 120 is in a working state.

In step 304, when the mobile terminal is in a working state, an instruction for instructing the mobile terminal is sent to the module terminal to shift its state into a standby state.

After the mobile terminal 120 receives the instruction for instructing the mobile terminal to shift its state into a standby state, the mobile terminal shifts its working state into a standby state.

In sum, in the method for controlling a working state provided by the embodiment, it may be decided whether to shift the mobile terminal having established a communication link with the playback device 160 into a standby state by detecting the working state of the playback device 160, thereby lowering power consumption and extending usage time.

Figure 4:
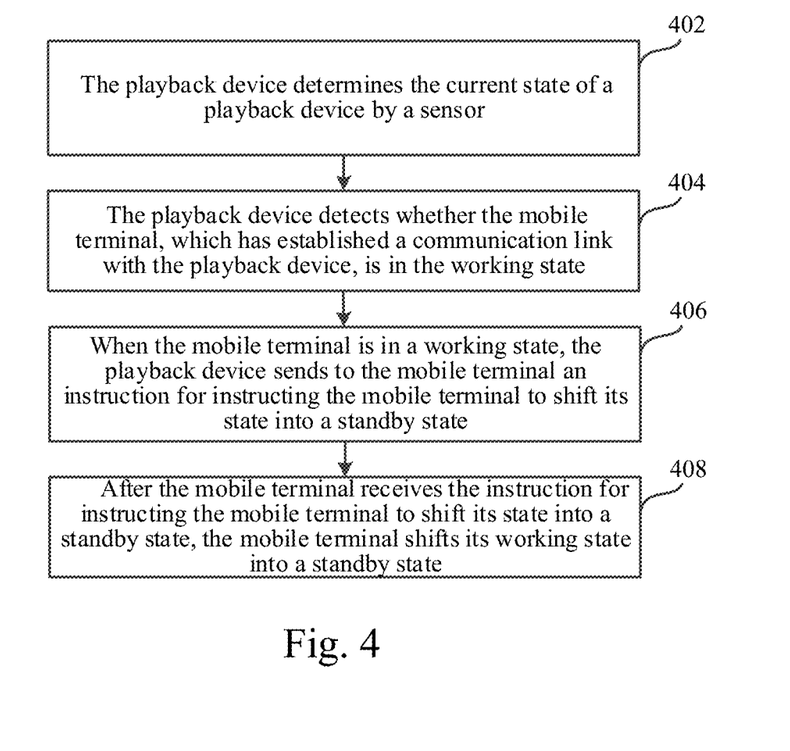
FIG. 4 is a flow chart of a method for controlling a working state according to another exemplary embodiment.

FIG. 4 is a flow chart of a method for controlling a working state according to another exemplary embodiment. For example, the embodiment is applicable in the implementation environment shown in FIG. 1. The method includes the following steps.

In step 402, the playback device determines a current state by a sensor.

If the current state is a working state, no action is proceeding. If the current device is in an inactive state, execute step 404.

In some embodiments, when the sensor is a pressure sensor which generates a pressure signal in the case of an active state, it is determined that the current state is in the inactive state, according to that the pressure signal, detected by the pressure sensor, is less than a pressure threshold value. For example, when the playback device is a headset VR player, it is required to be wore on the user's head while using the headset VR player, and a pressure signal will be generated by a pressure sensor at an area where the user's face comes into contact with the headset VR player. Accordingly, it may be determined that the user is using the headset VR player and the current state is a working state. If the pressure sensor has detected that the pressure signal is less than a pressure threshold value, it may be determined that the current state is in an inactive state. Here, the headset VR player is an example of the playback device only, and the playback device may be other device which could generate a pressure signal with other manner when the device is in an active state.

Alternatively, when the sensor is an optical sensor which generates light signal intensity in the case of an active state, it is determined that the current state is in the inactive state, according to that the light signal intensity, detected by the optical sensor, is less than a light signal threshold value. For example, when the playback device is smart glasses, wearing the smart glasses may trigger a light emission to the screen of the glasses, and the optical sensor detects the light signal intensity and determines that the current state is a working state. If the light signal intensity is less than a light signal threshold value, it may be determined that the current state is in an inactive state. In addition, other way can be employed to determine the light signal intensity.

Otherwise, when the light signal intensity is greater than the light signal threshold value, it may be determined that the current state is in an inactive state. For example, when the user wears the smart glasses, a light signal received by the optical sensor may be interrupted, and thus the optical sensor detects little light signal. At this time, it may be determined that the current state is an active state. If the optical sensor detects that light signal intensity is greater than a light signal threshold value, it may be determined that the current state is in an inactive state. Here, the smart glasses is an example of the playback device only. The playback device may be other device having an optical sensor.

Alternatively, when the sensor is a position sensor, it is determined that the current state is in the inactive state, according to that a position move value, detected by the position sensor, is less than a move threshold value. For example, when the playback device is a wearable device, after a user wears the wearable, it may be determined that the current state is in the active state according to that the position sensor in the wearable device detects that a position move value is not less than a move threshold value. It may be determined that the current state is in the active state according to that the position sensor in the wearable device detects that a position move value is not less than a move threshold value device.

The above sensors may be disposed inside the playback device, or may establish a link with the playback device in a manner of wired or wireless communication.

In step 404, the playback device detects whether the mobile terminal, which has established a communication link, is in the working state.

The playback device establishes a communication link with the mobile terminal in a manner of wired or wireless communication. When the manner is a wired communication link, the external interfaces of the playback device and the mobile, such as the USB interfaces, may be linked by a data line. When the manner is a wireless communication link, the mobile terminal and the playback device may be connected by a Wi-Fi (Wireless Fidelity) connection, a Bluetooth connection and the like.

Multimedia information or mutual information is sent by a communication link between the mobile terminal and the playback device. For example, in the case that the playback device plays a multimedia file, the selected multimedia file is invoked and played by opening an application of the mobile terminal in the playback device. Audio and Video are sent from the mobile terminal via a communication link to the playback device to be played. For example, in the case of controlling one mobile terminal, the playback device sends, via the communication link, a controlling instruction to the mobile terminal. The mobile terminal subsequently feed the response result back to the playback device via the communication link to complete the interaction. The mutual information refers to operating information between the playback device and the mobile terminal, for example, controlling instructions, opening instructions, closing instructions and the like, and various response information.

Accordingly, by detecting whether multimedia information or mutual information sent by the mobile terminal is received, it may be determined whether the mobile terminal is in a working state.

In step 406, when the mobile terminal is in a working state, the playback device sends to the mobile terminal an instruction for instructing the mobile terminal to shift its state into a standby state. When the mobile terminal is in the inactive state, no action is proceeding.

In step 408, after the mobile terminal receives the instruction for instructing the mobile terminal to shift its state into a standby state, the mobile terminal shifts its working state into a standby state.

In sum, according to the method for controlling a working state provided by the embodiment, it may decide whether to shift the mobile terminal having established a communication link with the playback device into a standby mode by detecting the working state of the playback device, thereby lowering power consumption and extending usage time.

The follow description is an embodiment of the disclosed apparatus, which can execute the implementation of the disclosed method. For the undisclosed details in the embodiment of the disclosed apparatus, please refer to the embodiments of the disclosed method.

Figure 5:
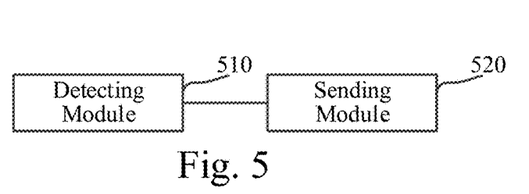
FIG. 5 is a block diagram of an apparatus for controlling a working state according to an exemplary embodiment.

FIG. 5 is a block diagram of an apparatus for controlling a working state according to an exemplary embodiment, and the apparatus may be implemented as part or whole of an electrical apparatus by software, hardware or combination of the both. The apparatus may include: a detecting module 510 and a sending module 520.

The detecting module 510 is configured to when it is determined that a current state is in an inactive state, by a sensor, detect whether a mobile terminal, which has established a communication link, is in a working state;

The sending module 520 is configured to when the mobile terminal is in the working state, send to the mobile terminal an instruction for instructing the mobile terminal to shift its state into a standby state.

In some embodiments, when the sensor is a pressure sensor which generates a pressure signal in the case of an active state, it is determined that the current state is in the inactive state, according to that the pressure signal, detected by the pressure sensor, is less than a pressure threshold value.

Alternatively, when the sensor is an optical sensor which generates light signal intensity in the case of an active state, it is determined that the current state is in the inactive state, according to that the light signal intensity, detected by the optical sensor, is less than a light signal threshold value.

Alternatively, when the sensor is a position sensor, it is determined that the current state is in the inactive state, according to that a position move value, detected by the position sensor, is less than a move threshold value.

In some embodiments, the detecting whether a mobile terminal, which has established a communication link, is in a working state, includes: detecting whether multimedia information or mutual information sent from the mobile terminal is received.

In sum, according to the device for determining a working state, it may decide whether to shift the mobile terminal having established a communication link with the playback device into a standby state by detecting the working state of the playback device, thereby lowering power consumption and extending usage time.

Figure 6:
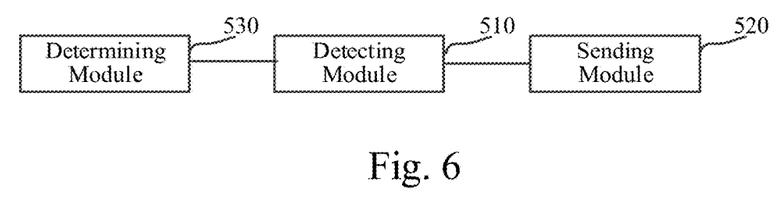
FIG. 6 is a block diagram of an apparatus for controlling a working state according to another exemplary embodiment.

FIG. 6 is a block diagram of an apparatus for controlling a working state according to another exemplary embodiment, and the apparatus may be implemented as part or whole of an electrical apparatus by software, hardware or combination of the both. The apparatus includes:

a detecting module 510, configured to when it is determined that a current state is in an inactive state, by a sensor, detect whether a mobile terminal, which has established a communication link, is in a working state; and a sending module 520, configured to when the mobile terminal is in the working state, send to the mobile terminal an instruction for instructing the mobile terminal to shift its state into a standby state.

In some embodiments, a determining module 530 is configured to when the sensor is a pressure sensor which generates a pressure signal in the case of an active state, determine that the current state is in the inactive state, according to that the pressure signal, detected by the pressure sensor, is less than a pressure threshold value.

Alternatively, when the sensor is an optical sensor which generates light signal intensity in the case of an active state, determine that the current state is in the inactive state, according to that the light signal intensity, detected by the optical sensor, is less than a light signal threshold value.

Alternatively, when the sensor is a position sensor, determine that the current state is in the inactive state, according to that a position move value, detected by the position sensor, is less than a move threshold value.

In some embodiments, the detecting module 510 is configured to detect whether multimedia information or mutual information sent from the mobile terminal is received.

In sum, according to the device for determining a working state, it may decide whether to shift the mobile terminal having established a communication link with the playback device into a standby state by detecting the working state of the playback device, thereby lowering power consumption and extending usage time.

With respect to the apparatus in the above embodiment, the detailed manner of operation executed by respective modules thereof has been described in the embodiments of the disclosed method, the repeated description will be omitted.

A apparatus for controlling a working state illustrated in another exemplary embodiment, includes:

a processor; and a memory, configured to store instructions executable by the processor, wherein, the processor is configured to:

when it is determined that a current state is in an inactive state, by a sensor, detect whether a mobile terminal, which has established a communication link, is in a working state; and when the mobile terminal is in the working state, send to the mobile terminal an instruction for instructing the mobile terminal to shift its state into a standby state.

The above sensor includes: a pressure sensor, an optical sensor, a position sensor or the like.

The above processor determines that the current state is in the inactive state, according to that a pressure signal, detected by the pressure sensor, is less than a pressure threshold value; or the processor determines that the current state is in the inactive state, according to that a light signal intensity, detected by the optical sensor, is less than a light signal threshold value; or the processor determines that the current state is in the inactive state, according to that a position move value, detected by the position sensor, is less than a move threshold value.

The processor may further includes a detector by which the processor detects whether a receiver receives multimedia information or mutual information sent from the mobile terminal.

An apparatus for controlling a working state, including:

a detecting circuit, configured to when it is determined that a current state is in an inactive state, by a sensor, detect whether a mobile terminal, which has established a communication link, is in a working state; and a sending circuit, configured to when the mobile terminal is in the working state, send to the mobile terminal an instruction for instructing the mobile terminal to shift its state into a standby state.

The apparatus further includes a determining circuit, configured to:

when the sensor is a pressure sensor which generates a pressure signal in the case of an active state, determine that the current state is in the inactive state, according to that the pressure signal, detected by the pressure sensor, is less than a pressure threshold value; or when the sensor is an optical sensor which generates light signal intensity in the case of an active state, determine that the current state is in the inactive state, according to that the light signal intensity, detected by the optical sensor, is less than a light signal threshold value; or when the sensor is a position sensor, determine that the current state is in the inactive state, according to that a position move value, detected by the position sensor, is less than a move threshold value.

In the apparatus, the detecting circuit is configured to detect whether multimedia information or mutual information sent from the mobile terminal is received.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method performed by a playback device for controlling a working state of a mobile terminal, the playback device configured to receive and play multimedia information provided by the mobile terminal and comprising a sensor, a detector and a transmitter, the method comprising:
    determining, by the sensor, that the playback device is currently in an inactive state;
    detecting, by the detector, whether multimedia information or mutual information sent from the mobile terminal is received to determine whether the mobile terminal is in a working state; and
    sending, by the transmitter, to the mobile terminal an instruction for instructing the mobile terminal to shift into a standby state when the mobile terminal is in the working state.

2. The method according to claim 1, wherein the sensor comprises a pressure sensor, and wherein determining, by the sensor, that the playback device is currently in the inactive state comprises:
    detecting, by the pressure sensor, that a pressure signal is less than a pressure threshold value; and
    determining that the playback device is currently in the inactive state.

3. The method according to claim 1, wherein the sensor comprises an optical sensor and wherein determining, by the sensor, that the playback device is currently in the inactive state comprises:
    detecting, by the optical sensor, that a light signal intensity is less than a light signal threshold value; and
    determining that the playback device is currently in the inactive state.

4. The method according to claim 1, wherein the sensor comprises a position sensor and wherein determining, by the sensor, that the playback device is currently in the inactive state comprises:
    detecting, by the position sensor, that a position move value is less than a move threshold value;
    determining that the playback device is currently in the inactive state.

5. A playback device for controlling a working state of a mobile terminal, the playback device configured to receive and play multimedia information provided by the mobile terminal and comprising:
    a processor;
    a sensor;
    a detector;
    a transmitter; and
    a memory, configured to store instructions executable by the processor,
    wherein the processor is configured to:
    determine, by the sensor, that the playback device is currently in an inactive state;
    detect, by the detector, whether multimedia information or mutual information sent from the mobile terminal is received to determine whether the mobile terminal is in a working state; and
    send, by the transmitter, to the mobile terminal an instruction for instructing the mobile terminal to shift into a standby state when the mobile terminal is in the working state.

6. The playback device according to claim 5, wherein the sensor comprises a pressure sensor, and wherein the processor configured to determine, by the sensor, that the playback device is currently in the inactive state is further configured to:
    detect, by the pressure sensor, that a pressure signal is less than a pressure threshold value; and
    determine that the playback device is currently in the inactive state.

7. The playback device according to claim 5, wherein the sensor comprises an optical sensor and wherein the processor configured to determine, by the sensor, that the playback device is currently in the inactive state is further configured to:
    detect, by the optical sensor, that a light signal intensity is less than a light signal threshold value; and
    determine that the playback device is currently in the inactive state.

8. The playback device according to claim 5, wherein the sensor comprises a position sensor and wherein the processor configured to determine, by the sensor, that the playback device is currently in the inactive state is further configured to:
    detect, by the position sensor, that a position move value is less than a move threshold value;
    determine that the playback device is currently in the inactive state.

9. A non-transitory computer-readable storage medium having stored therein instructions that, when executed by a processor of a playback device, causes the playback device to perform a method for controlling a working state of a mobile terminal, the playback device configured to receive and play multimedia information provided by the mobile terminal and comprising a sensor, a detector and a transmitter, the method comprising:
    determining, by the sensor, that the playback device is currently in an inactive state;
    detecting, by the detector, whether multimedia information or mutual information sent from the mobile terminal is received to determine whether the mobile terminal is in a working state; and
    sending, by the transmitter, to the mobile terminal an instruction for instructing the mobile terminal to shift into a standby state when the mobile terminal is in the working state.

10. The non-transitory computer-readable storage medium according to claim 9, wherein the sensor comprises a pressure sensor, and wherein determining, by the sensor, that the playback device is currently in the inactive state comprises:
    detecting, by the pressure sensor, that a pressure signal is less than a pressure threshold value; and determining that the playback device is currently in the inactive state.

11. The non-transitory computer-readable storage medium according to claim 9, wherein the sensor comprises an optical sensor and wherein determining, by the sensor, that the playback device is currently in the inactive state comprises:
   detecting, by the optical sensor, that a light signal intensity is less than a light signal threshold value; and
   determining that the playback device is currently in the inactive state.

12. The non-transitory computer-readable storage medium according to claim 9, wherein the sensor comprises a position sensor and wherein determining, by the sensor, that the playback device is currently in the inactive state comprises:
   detecting, by the position sensor, that a position move value is less than a move threshold value;
   determining that the playback device is currently in the inactive state.

\* \* \* \* \*